UNITED STATES PATENT OFFICE.

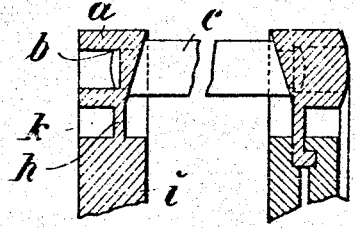
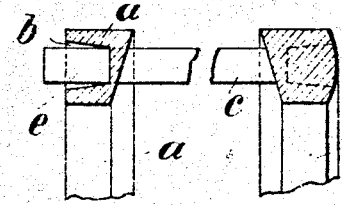
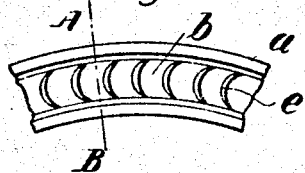
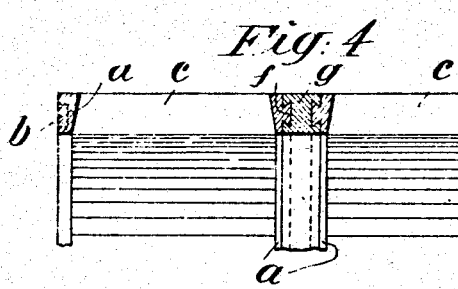
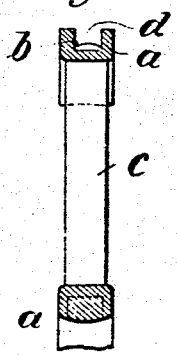

BIRGER LJUNGSTRÖM, OF STOCKHOLM, SWEDEN, ASSIGNOR TO AKTIEBOLAGET LJUNGSTROMS AUGTURBIN, OF STOCKHOLM, SWEDEN.

VANE-RING FOR TURBINES.

968,862.     Specification of Letters Patent.     Patented Aug. 30, 1910.

Application filed February 19, 1910. Serial No. 544,872.

*To all whom it may concern:*

Be it known that I, BIRGER LJUNGSTRÖM, engineer, a citizen of Sweden, residing at Grefmagnigatan 18, Stockholm, Sweden, have invented new and useful Improvements in Vane-Rings for Gas or Steam Turbines, of which the following is a specification.

My present invention relates to the vane-rings for gas or steam turbines to be attached to a stationary or rotating part of the turbine. Its object is to provide a simple, efficient, and cheap vane that will not get hot as soon as the vane rings now in use.

In the accompanying drawings: Figure 1 represents a vertical section view on the line A—B of Fig. 3 of one side of the device embodying my invention before the welding process; Fig. 1ᵃ represents a vertical section view on the line A—B of Fig. 3 of the right hand side of a modified form of the same after the welding process; Fig. 2 represents a vertical sectional view on the line A—B of Fig. 3 of a modified form of a vane ring embodying my invention, showing on the right the ring after the welding process and on the left before the welding process; Fig. 3, a view in side elevation of the form shown in Fig. 2, Fig. 4, a vertical sectional view of another form, in which the special reinforcing ring $g$ is used and the means of attaching the rings to the supporting ring is shown, and Fig. 5, a vertical sectional view of the vane ring for an axial turbine.

$a$ designates the rings for receiving the vanes.

$c$ designates the vanes, the ends of which extend into channels or grooves $b$ of said vane-rings $a$ and are welded by any suitable means therein, the channels $b$, preferably being filled or nearly filled with metal in the operation.

In my preferred form (shown in left hand of Fig. 1.) each of the vane-rings $a$ is separated from its support $i$ by means of a thin ring or strip $h$ integral with and connecting said support $i$ and ring $a$. This strip $h$ is formed by cutting out the metal at $k$. This allows the heat to radiate from this thin strip and to pass off without heating to any extent the support $i$ and provides for a low temperature and a quick cooling of the device. This connection $h$ between the vane ring $a$ and support $i$ may however be of several parts as shown at the right of Fig. 1. The ring $a$ and ring or strip $h$ are integral in that form, the ring $h$ being provided with an annular side extension on its inner edge and clamped between the two members of the support $i$.

In the welding operation before mentioned the channels $b$ are completely or partially filled with metal, which, welding with the channels and the vanes, makes a permanent connection and at the same time thickens the metal at that point, thereby greatly strengthening the rings. If desired, however, supporting rings may also be added as $g$ in Fig. 4 to add greater strength or the rings $a$ may be made thinner and the supporting rings $g$ added in place of a heavy filling in of the channels $b$.

In Figs. 2 and 3 a portion $e$ of the vanes $c$ extends a little beyond the side of the ring and fills up the channels in the welding process without the addition of other metal, solder, &c. Of course any suitable process of welding may be employed, the only object being to fasten them together the same as if they were one integral piece of metal and to fill or nearly fill the channels $b$, thereby greatly strengthening the device. The object in having the channels $b$ being to reduce the thickness of the metal at this point to facilitate the punching of the slots through which the vanes are to be inserted. After this has been accomplished and the vanes inserted it is desirable to thicken the rings at this point to add strength that they may withstand the strain put upon them and thus increase their length of life or durability.

In the form shown in Fig. 4 the rings $a$ are of thinner construction than that shown in the other views and are provided with the supporting ring $g$, to which they are secured by means of the dove-tail joint $f$ or any other suitable manner.

The rings may of course be integral or of two or more parts pressed together or attached to each other by any suitable means, the integral form however being the preferred form.

Having thus described my invention, what I claim as new and desire to secure by Letters Patent is:

1. A vane structure comprising vanes, two rings for receiving the ends of said vanes, said rings provided with channels which are slotted for the insertion of said vanes and secured to said vanes by welding, in combination with supports for said rings and a thin strip, integral with, and connecting each ring and its support.

2. A vane structure comprising vanes, two rings receiving the ends of said vanes and being suitably secured thereto, in combination with supports for said rings and thin strips, integral with said rings, connecting said supports and rings.

3. A vane structure comprising vanes, rings receiving the ends of said vanes and being suitably secured thereto, in combination with supports for said rings and thin strips connecting said rings and supports.

4. A vane structure comprising vanes, and rings for receiving the ends of said vanes, said rings being provided with channels which are slotted to receive the ends of said vanes, said rings and vanes being welded together.

5. A vane structure comprising vanes, rings for receiving the ends of said vanes, said rings and vanes being welded together, in combination with supporting rings and means for securing said rings thereto.

6. A vane structure comprising vanes, rings receiving the ends of said vanes, said vanes and rings being suitably secured to each other, in combination with a supporting ring, said rings and supporting ring being connected by means of dovetail joints.

In testimony whereof I have signed my name to this specification in the presence of two subscribing witnesses.

BIRGER LJUNGSTRÖM.

Witnesses:
HEDWIG MELINDER,
HARRY ALBILM.